UNITED STATES PATENT OFFICE.

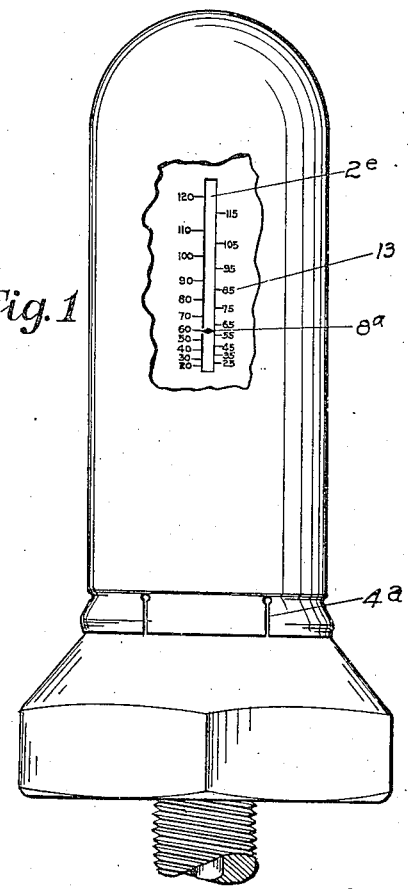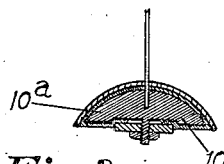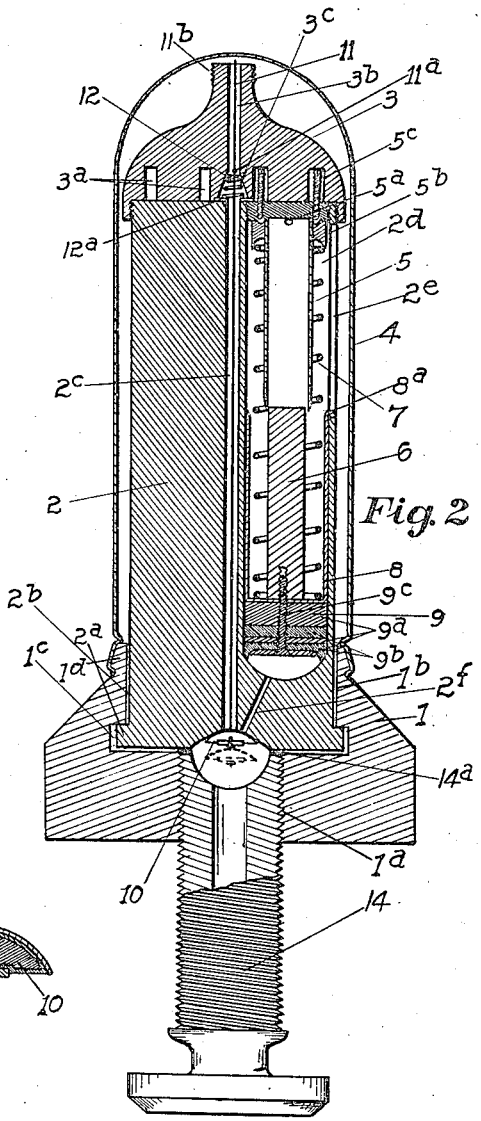
O. F. R. BROMBERG.
COMBINED TIRE VALVE AND PRESSURE GAGE.
APPLICATION FILED JUNE 3, 1915.
1,176,338. Patented Mar. 21, 1916.
Fig. 1
Fig. 2
Fig. 3
Oscar F. R. Bromberg
INVENTOR.
BY A. B. Bowman
ATTORNEY.

OSCAR F. R. BROMBERG, OF SAN DIEGO, CALIFORNIA.

COMBINED TIRE-VALVE AND PRESSURE-GAGE.

1,176,338.  Specification of Letters Patent.  Patented Mar. 21, 1916.

Application filed June 3, 1915. Serial No. 31,888.

*To all whom it may concern:*

Be it known that I, OSCAR F. R. BROMBERG, a citizen of the United States, residing at San Diego, in the county of San Diego and State of California, have invented certain new and useful Improvements in Combined Tire-Valves and Pressure-Gages, of which the following is a specification.

My invention relates to a combined tire valve and pressure gage for pneumatic tires.

The objects of my invention are, first, to provide a combined tire valve and pressure gage by the use of which the amount of pressure in the tire may be readily ascertained while it is being filled or at any other time as desired; second, to provide a new and novel construction of tire valve; third, to provide a new and novel construction of pressure gage to be used in connection with said tire valve; fourth, to provide such a combined tire valve and pressure gage in which the scale of the pressure gage may be turned to any position desired relatively to the tire when placing the same in position on the tire, and fifth, to provide such a combined tire and pressure gage which is simple and economical of construction, durable, easily installed and does not readily get out of order.

With these and other objects in view as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification in which:

Figure 1, is a side elevational view of my device complete, showing a portion of the cap broken away to illustrate the pressure scale; Fig. 2, is a sectional view thereof at right angles thereto and Fig. 3, is a detail enlarged sectional view of the tire valve.

Similar characters of reference refer to similar parts throughout the several views.

The base piece 1, intermediate piece 2, cap 3, dust cap 4, cylindrical piece 5, plug 6, spring 7, indicator piece 8, plunger 9, valve 10, valve rod 11, valve spring 12, scale 13, and air conductor 14 constitute the principal parts of my device.

The base piece 1 is preferably hexagon shaped, adapted for a wrench to facilitate its turning on the air conductor 14. It is provided with a hole $1^a$ provided with a thread adapted for the threads on the air conductor 14. In the upper portion of said base piece 1 is provided a larger hole $2^b$ which extends to the hole $1^a$ which is adapted for the intermediate piece 2. This hole is provided with an annular recess $1^c$ adapted for the collar $2^a$ around the lower end of said intermediate piece 2. Between the air conductor 14 and the intermediate piece 2 is provided a gasket $14^a$ adapted to provide a tight fit between the end of the air conductor 14 and the intermediate piece 2. This intermediate piece 2 is provided centrally with a hole $2^c$ extending longitudinally therethrough and with a chamber $2^d$ in one side thereof extending longitudinally therein. This chamber is provided with a slot $2^e$ in one side thereof extending through the wall between the chamber $2^d$ and the outer surface of the intermediate piece 2. Between the lower end of this chamber $2^d$ and the end of the intermediate piece 2 is provided a port $2^f$ adapted to allow the air to enter the chamber $2^d$ from the tire or from the hole $2^c$ when there is a certain pressure in the tire or when air is being pumped into the tire. In the upper end of this chamber $2^d$ is secured the cylindrical piece 5 by means of a threaded part screwed into threads in the top end of the chamber $2^d$. This cylindrical piece 5 is provided with a hole $5^a$ adapted to relieve the pressure when the piece 5 and plug 6 are telescoped together. Mounted around the cylindrical piece 5 is provided an adjusting washer $5^b$ which is provided with an annular groove adapted for the spring 7 to rest in and with a similar groove in its upper surface adapted for the ends of the screws $5^c$ which extend through and are screwed into the upper projecting portion of the cylindrical piece 5 and adapted to adjust the washer $5^b$ in certain positions for adjusting the tension of the spring 7. Mounted in the lower end of the chamber $2^d$ is provided the plunger 9 which comprises metallic washers $9^a$ and flexible or elastic washers $9^b$, preferably leather. Secured to this plunger 9 by means of the bolt $9^c$ is the plug 6 which is adapted to telescope into the lower end of the cylindrical piece 5, said cylindrical piece 5 and said plug, serving as a core for the spring 7.

Mounted between the plug 6 and the upper washer 9ª is the indicating piece 8 which is in the form of a spider with one of its members extending outwardly at point 8ª adapted to move longitudinally in the slot 2ᵉ for indicating the pressure in the tire by means of the scale 13 on the outer surface of the intermediate piece 2 adjacent the sides of said slot as the plunger 9 is raised and lowered in the chamber 2ᵈ by means of the air pressure through the port 2ᶠ.

Mounted on the top end of the intermediate piece 2 by means of threads is the cap piece 3 which is provided with a plurality of annular recesses 3ª adapted for the ends of the screws 5ᶜ. This cap piece 3 is provided with a central hole 3ᵇ conforming to the hole 2ᶜ in the intermediate piece 2. Near the lower surface is provided an enlarged portion 3ᶜ forming a recess for the spring 12. The lower end of said spring is mounted on a gasket 12ª which is adapted to prevent leakage between the intermediate piece 2 and the cap 3. The other end of said spring 12 engages with a small flattened portion 11ª on the rod 11. On the upper end of this cap 11 is provided a threaded portion 11ᵇ adapted for the nozzle of the air hose. The valve rod 11 extends from slightly above the upper end of said cap 3 downwardly through the hole 3ᵇ and 2ᶜ and on its lower end is secured the tire valve 10 which comprises a metallic piece 10ª covered with a pliable material. The upper surface of this valve is adapted to cover the lower ends of the holes 2ᶜ and the port 2ᶠ in the valve seat. Mounted around and covering the upper portion of my device is the dust cap 4 which is sprung onto the annular lug 1ᵈ it being provided with a plurality of slots 4ª adapted to facilitate its engagement and release from said lug.

Though I have shown and described a particular construction, combination and arrangement of parts I do not wish to be limited to this particular construction, combination and arrangement but desire to include in the purview of my invention the construction, combination and arrangement substantially as set forth in the appended claims.

It is obvious that with this construction there is provided a combined tire valve and pressure gage for testing the pressure in tires; that is simple and economical of construction, durable, easily installed and easily operated; that the device is adjustable throughout and consists of separate chambers, the one for the air pressure gage and the other for the tire valve operating mechanism; that the scale may be adjusted to any position when placing the device on the tire by reason of the swivel connection between the base piece 1 and the intermediate piece 2.

Having thus described my invention, what I claim as new and desire to secure by Letters Patent, is—

1. In a combined tire valve and pressure gage, the combination of a base piece, an intermediate piece mounted therein provided with a valve seat at its lower end and a central hole longitudinally therethrough serving as an air conductor and with a chamber disposed in one side thereof with a port, said port and central hole terminating in said valve seat, an air valve covering the lower end of said central hole and said port in said valve seat, a plunger reciprocally mounted in said chamber, yielding means engaging with said plunger and means for indicating the pressure on said plunger in connection with said plunger.

2. In a combined tire valve and pressure gage, the combination of a base piece, an intermediate piece mounted therein provided with a valve seat at its lower end and a central hole longitudinally therethrough serving as an air conductor and with a chamber disposed in one side thereof with a port, said port and central hole terminating in said valve seat, an air valve covering the lower end of said central hole and said port in said valve seat, a plunger reciprocally mounted in said chamber, yielding means engaging with said plunger, means for indicating the pressure on said plunger in connection with said plunger and a cap piece screwed on the top of said intermediate piece provided with a central aperture adapted for the extended end of said valve stem.

3. In a combined tire valve and pressure gage, the combination of a base piece, an intermediate piece mounted therein provided with a valve seat at its lower end and an air conductor centrally through said intermediate piece and with a chamber with a port, said port and central hole terminating in said valve seat, an air valve covering the lower end of said central hole and said port in said valve seat, a plunger reciprocally mounted in said chamber, yielding means engaging with said plunger and means for indicating the pressure on said plunger in connection with said plunger.

4. In a combined tire valve and pressure gage, the combination of a base piece, an intermediate piece secured in said base piece provided with a valve seat and with a central hole extending longitudinally therethrough and with a chamber disposed in one side thereof and an air port extending from said chamber to said valve seat, a valve covering the lower end of said central hole and said air port, a plunger reciprocally mounted in said chamber, yielding means adjustably mounted in said chamber in engagement with said plunger and said intermediate piece, a cap rigidly secured on the upper end of said intermediate piece provided with an aperture in the center thereof extending the hole in said central piece and a valve stem extending from said valve through said central hole in said intermediate piece and said aperture in said cap.

5. In a combined tire valve and pressure gage, the combination of a base piece, an intermediate piece secured in said base piece provided with a valve seat and with a central hole extending longitudinally therethrough and with a chamber disposed in one side thereof and an air port extending from said chamber to said valve seat, a valve covering the lower end of said central hole and said air port in said valve seat, a plunger reciprocally mounted in said chamber, yielding means adjustably mounted in said chamber in engagement with said plunger, pressure indicating means in connection with said plunger and said intermediate piece, a cap rigidly secured on the upper end of said intermediate piece provided with an aperture in the center thereof extending the hole in said central piece, a valve stem extending from said valve through said central hole in said intermediate piece and said aperture in said cap and a dust cap mounted over the upper portion of said base piece.

In testimony whereof, I have hereunto set my hand, at San Diego, California, this 29th day of May, 1915.

OSCAR F. R. BROMBERG.